United States Patent
Kämmerer (10) Patent No.: US 6,655,738 B2
(45) Date of Patent: Dec. 2, 2003

(54) VEHICLE SEAT HAVING A FOLDED POSITION

(75) Inventor: Joachim Kämmerer, Kaiserslautern (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 0 days.

(21) Appl. No.: 10/127,269

(22) Filed: Apr. 22, 2002

(65) Prior Publication Data

US 2002/0125753 A1 Sep. 12, 2002

Related U.S. Application Data

(63) Continuation of application No. PCT/EP01/10058, filed on Aug. 31, 2001.

(30) Foreign Application Priority Data

Sep. 14, 2000 (DE) .......................................... 100 45 474

(51) Int. Cl.[7] .................................................. A47C 1/02
(52) U.S. Cl. .................... 297/331; 297/344.1; 297/336; 297/378.12; 296/65.09
(58) Field of Search ............................. 297/344.1, 341, 297/340, 15, 331, 335, 336, 334, 325, 326; 296/65.09, 65.05

(56) References Cited

U.S. PATENT DOCUMENTS

| 4,736,985 A | * | 4/1988 | Fourrey et al. ............... 296/69 |
| 4,888,854 A | * | 12/1989 | Russell et al. ................ 16/260 |
| 4,925,229 A | * | 5/1990 | Siebler .................... 296/65.09 |
| 5,158,338 A | | 10/1992 | Hayakawa et al. |
| 5,195,795 A | | 3/1993 | Cannera et al. |
| 5,393,116 A | * | 2/1995 | Bolsworth et al. ....... 296/65.03 |
| 5,482,349 A | | 1/1996 | Richter et al. |
| 5,577,805 A | * | 11/1996 | Glinter et al. .......... 296/65.03 |
| 5,634,686 A | * | 6/1997 | Okazaki .................. 296/65.03 |
| 5,641,202 A | * | 6/1997 | Rus ......................... 296/65.09 |
| 5,957,522 A | * | 9/1999 | Matsuhashi et al. ..... 296/65.09 |
| 6,079,763 A | | 6/2000 | Clemente |
| 6,595,588 B2 | * | 7/2003 | Ellerich et al. ............. 297/331 |

FOREIGN PATENT DOCUMENTS

| DE | 699 589 | 11/1940 |
| DE | 44 39 975 A1 | 5/1996 |
| DE | 195 33 932 A1 | 3/1997 |
| DE | 196 07 060 C1 | 4/1997 |
| EP | 0 364 146 A2 | 4/1990 |
| EP | 0 622 268 A1 | 11/1994 |
| ES | 2 147 090 A1 | 8/2000 |
| FR | 2 589 800 A1 | 5/1987 |
| GB | 2068216 A | 8/1981 |
| GB | 2 095 984 A | 10/1982 |
| GB | G 87 16 848.0 U1 | 3/1988 |
| JP | 55 164532 A | 3/1981 |
| WO | WO 01/19640 A2 | 3/2001 |

OTHER PUBLICATIONS

U.S. patent application Ser. No. 10/097,550, filed March 11, 2002; Inventors: Ellerich et al., entitled *Vehicle Seat Having a Folded Position*.

* cited by examiner

*Primary Examiner*—Anthony D. Barfield
*Assistant Examiner*—Stephanie Harris
(74) *Attorney, Agent, or Firm*—Alston & Bird LLP (57) ABSTRACT

In the case of a vehicle seat (1), in particular a motor vehicle seat, having a seat cushion (3), a backrest (5) and an articulated seat frame (9, 11, 21, 29, 31) with feet (11, 21) which are to be fastened releasably to the vehicle structure, it is possible for the vehicle seat (1) to be adjusted between at least one seat position, which is suitable for conveying a person, and a folded position. In order for the vehicle seat (1) to be transferred from the seat position into the folded position, after the feet (21) present in the region of the backrest (5) have been released, the backrest (5) executes a shifting movement in the direction of the seat cushion (3).

36 Claims, 7 Drawing Sheets

VEHICLE SEAT HAVING A FOLDED POSITION

CROSS-REFERENCE TO RELATED APPLICATION

This is a continuation of International Application No. PCT/EP01/10058, filed Aug. 31, 2001, and incorporated herein by reference.

BACKGROUND OF THE INVENTION

The present invention relates to a vehicle seat, in particular a motor vehicle seat.

The second and/or third seat rows of multipurpose vehicles (MPV), such as, for example, vans or high-capacity sedans, are generally configured in such a manner that the interior can be adjusted in a variable manner for transportation of people or goods. For example, DE 44 39 975 A1 discloses a vehicle seat having a "package position" which is reached by the backrest being folded onto the seat cushion and then, after release of the rear foot, the entire vehicle seat being folded forward through approximately 90°, so that a large loading area is produced. However, in the case of a solution of this type, there may be the problem, for example, that before the package position is reached the head restraint comes into contact with the vehicle floor and prevents further folding forward. In addition, the operation using numerous movements leaves things to be desired.

SUMMARY OF THE INVENTION

One aspect of the present invention is the provision of a vehicle seat having an articulated seat frame carrying a seat cushion and a backrest, with the seat frame including rear feet that are generally in the region of the backrest for being releasably fastened to the vehicle structure. The seat frame is operative so that the vehicle seat can be adjusted between at least one seat position and a folded position, which is also referred to herein as the package position. In the seat position, the seat cushion extends at least generally horizontally and the backrest extends upright so that a user can sit in the vehicle seat. The seat frame is further operative so that in order for the backrest to be transferred from the seat position to the folded position, after the rear feet are unfastened from the vehicle structure, the backrest executes a shifting movement in the direction of the seat cushion.

By virtue of the fact that, in order to transfer the seat from the seat position into the folded position, after the appropriate feet have been released, the backrest executes a shifting movement in the direction of the seat cushion, which movement takes place at least substantially without any change in the inclination of the backrest, striking of the backrest or of the head restraint thereof against the vehicle floor is at least generally avoided, as too is striking against the vehicle roof lining at least generally avoided. In a conventional orientation of the vehicle seat, or with reference to a conventional frame of reference defined by a vehicle seat in the seat position, the feet at the rear are released and the backrest is shifted forward. The solution according to this aspect of the present invention is suitable both for front-passenger seats and also for the second seat row and other seat rows, if they are present.

During the shifting movement of the backrest, the seat cushion preferably folds upward with a pivoting movement, i.e. forward and upward in a conventional orientation. This provides space for shifting the backrest forward and is space-saving at the same time, since two vehicle seats can be arranged one behind the other in the package position. In this case, the surfaces of the seat cushion and backrest, which face the user in the seat position, i.e. the upholstered surfaces, preferably "point" (i.e., face) at least approximately in the same direction in the package position, i.e. as a rule forward, with the result that they are at the same time protected by the vehicle seat in the front seat row.

In a preferred embodiment, the movements of the backrest and of the seat cushion between the seat position and the package position are coupled by coupling means. This enables one-handed operation over the entire path, i.e. an easy transfer into the package position ("easy package"), since the seat cushion and the backrest can then be transferred automatically and together into the different positions. A refinement of this type with simplified operation is ideal for three-row seat arrangements, since the occupant of the third seat row can then easily get out of the vehicle after he has himself moved a second seat row, that is configured according to the present invention, into the package position. However, two-handed operation without coupling means is also possible.

The coupling mentioned may be undertaken, for example, by a slot and tenon guide which defines a path having a single degree of freedom and can be used at the same time for tolerance compensation. The slot and tenon guide can in principle be provided between any two components of all of the moving components. The definition of the path can also be undertaken by the interaction of a plurality of couplers. A pneumatic spring which assists the pivoting movement of the seat cushion can keep the effort for the transfer into the package position small.

It is advantageous if a securing means secures the vehicle seat in the package position. Preferably the securing means operates automatically, i.e. without further action by the operator. The occupants are then better protected from the load in crash incidents, and the vehicle seat does not inadvertently leave the package position. In a preferred design, the feet present in the region of the backrest have fastening means which serve both for the fastening of the feet to the vehicle structure and for the securing of the package position. Fastening means of this type having two functions reduce the production costs. For example, a catch can be provided which can be hooked in at two differently arranged bolts, or, conversely, a bolt can interact with two catches. Depending on the intended use of the vehicle seat, its moveable seat frame (kinematics) can also be locked by a backrest lock, in which case the automatic package securing means is then omitted.

A single operating element is preferably provided for triggering the transfer into the package position and for triggering the return into the seat position, which simplifies the operation of the vehicle seat. This operating element then unlocks the bifunctional fastening means. The operating element is arranged in a readily accessible manner, for example in the region of the upper edge of the backrest.

In a preferred design, the vehicle seat can be connected to the vehicle structure in various longitudinal seat positions and can optionally be removed completely, for example by all of the feet being releasable and various fastening options being provided on the vehicle structure or by seat rails which can be displaced with respect to one another and are of a known type being used for fixing the feet.

BRIEF DESCRIPTION OF THE DRAWINGS

The invention is explained in greater detail below with reference to three exemplary embodiments which are illustrated in the drawings, in which.

DETAILED DESCRIPTION OF THE INVENTION

The invention is explained in greater detail below with reference to three exemplary embodiments which are illustrated in the drawings and have modifications.

Figure 1:
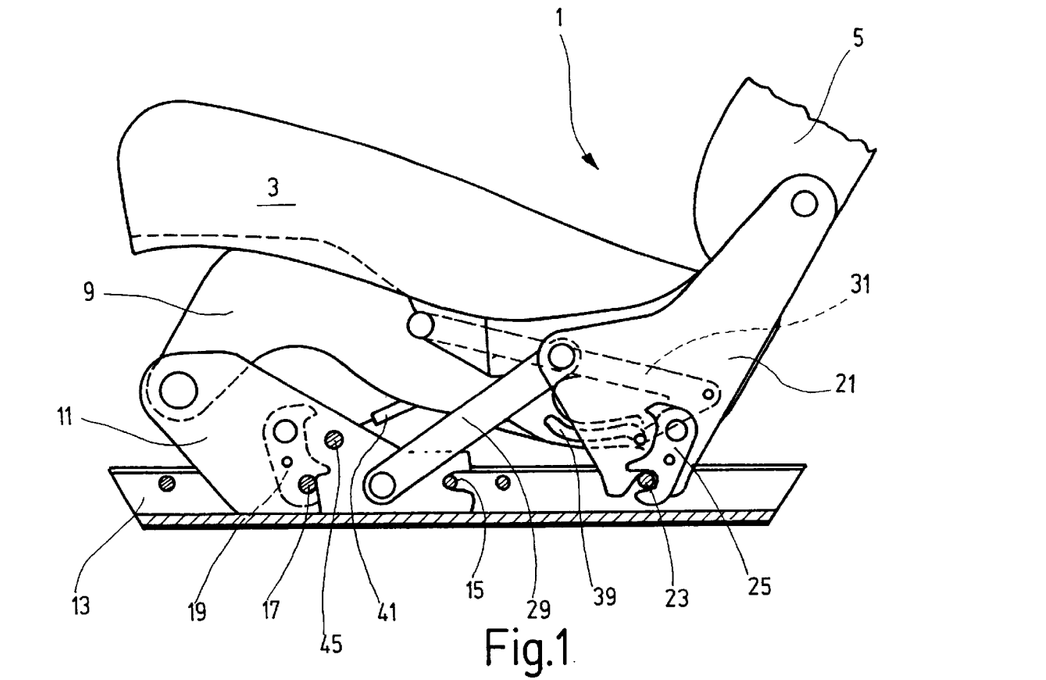
FIG. 1 shows a partially cut away side view of the first exemplary embodiment, in the seat position.
Figure 4:
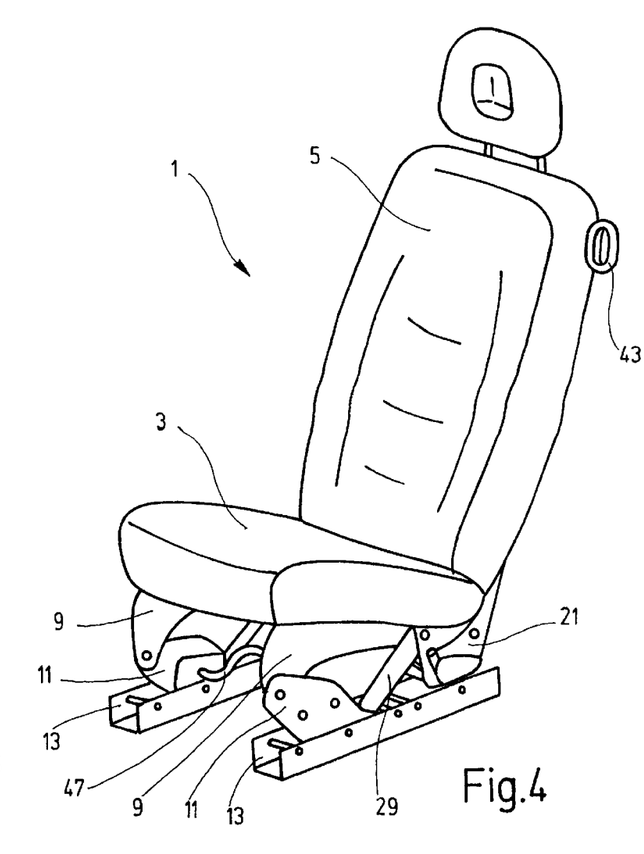
FIG. 4 shows a perspective view of the first exemplary embodiment, in the seat position.

According to the first exemplary embodiment, a vehicle seat 1 for the rear of a motor vehicle, for example a van, has a seat cushion 3 and a backrest 5. The following directional details are based on the backrest 5 being arranged behind the seat cushion 3 in the forward direction of travel. The seat cushion 3 is provided with a seat cushion support 9 with a respective front foot 11 being coupled to it on the outside of its front end region on both sides of the essentially symmetrical vehicle seat 1, in which case the pivot axes defined thereby are aligned with one another. For the sake of simplicity, only the left vehicle seat side will be described below, specifically first of all in the seat position of the vehicle seat 1 suitable for conveying a person.

The front foot 11 is arranged with its lower part in a rail 13, which is orientated in the longitudinal direction of the vehicle and seat and is fixed on the vehicle structure, is pushed rearward over a central rail bolt 15, which is orientated in the transverse direction of the seat and is fixed on the rail, is pushed from above over a front rail bolt 17, which is orientated in the transverse direction of the seat and is fixed on the rail, and is releasably locked by means of a front catch 19 which is coupled to the front foot 11 and hooks in place in a spring-loaded manner on the front rail bolt 17. In this case, the front rail bolt 17 is arranged in the longitudinal direction behind the coupling point between the front foot 11 and seat cushion support 9.

A rear foot 21 is pushed with its lower part from above over a rear rail bolt 23, which is orientated in the transverse direction of the seat and is fixed on the rail, and is locked releasably by means of a rear catch 25 which is coupled to the rear foot 21 and hooks in place in a spring-loaded manner on the rear rail bolt 23. The backrest 5 is fitted on the upper part of the rear foot 21, for example by means of hinged fittings, for adjusting the inclination. A first coupler 29 is coupled as a link at one end to the rear foot 21, on its inside, and at the other end to the front foot 11, on its outside. A second coupler 31 is coupled at one end to the seat cushion support 9, on the inside, and at the other end to the rear foot 21, on its inside. The seat cushion support 9, the front and rear feet 11 and 21 and the couplers 29 and 31 form a seat frame, which is of articulated design, of the vehicle seat 1.

Figure 2:
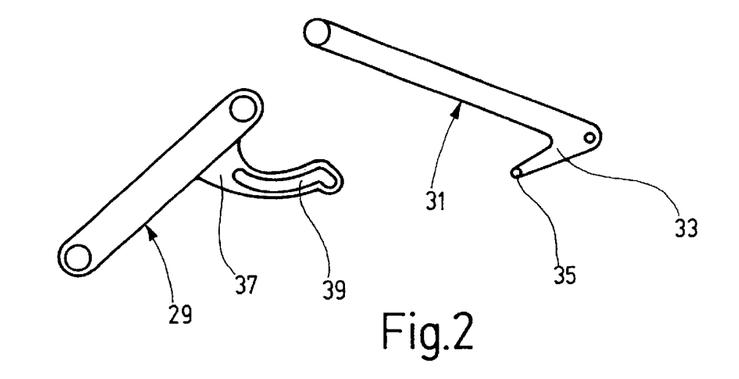
FIG. 2 shows a view of two couplers of the first exemplary embodiment.

At its end coupled to the rear foot 21, the second coupler 31 is provided with an arm 33 which points forward and slightly downward in the seat position. The arm 33 bears a link block 35, preferably a tenon which is orientated in the transverse direction of the seat. In the region of its end coupled to the rear foot 21, the first coupler 29 is provided with a link arm 37 which points rearward in the seat position and has a laterally opened, slot-shaped connecting link 39. The link block 35 of the second coupler 31 engages in the connecting link 39 of the first coupler 29 in the manner of a slot and tenon guide. A pneumatic spring 41 is coupled at one end to the front foot 11 and at the other end to the seat cushion support 9, specifically in each case in the rear regions thereof.

Figure 3:
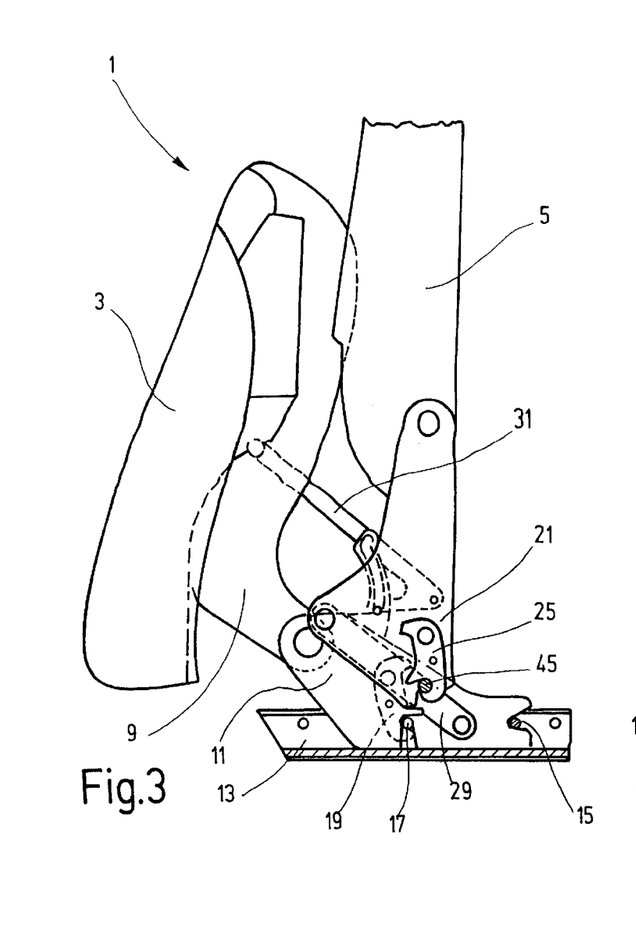
FIG. 3 shows an illustration corresponding to FIG. 1, in the package position.

In order to transfer the seat into the package position, the rear catch 25 is unlocked by means of an operating element 43 fitted on the backrest 5, preferably in the region of the upper edge thereof. The pneumatic spring 41 then presses the seat cushion support 9 together with the seat cushion 3 upward in such a manner that the latter executes a pivoting movement forward, with the coupling point on the front foot 11 as a pivot. The rear foot 21 is pulled forward via the second coupler 31, the first coupler 29 serving as a pivot arm. In the process, the link block 35 of the second coupler 31 moves within the connecting link 39 of the first coupler 29, as a result of which the forward movement of the rear foot 21 is defined. The forward movement of the rear foot 21 causes the backrest 5 to be shifted forward.

During this shifting movement of the backrest 5 the inclination of the backrest 5 remains at least virtually unchanged while the coupling point of the rear foot 21 on the first coupler 29 executes a pivoting movement forward. The control via the connecting link guide between the couplers 29 and 31 not only has the effect that the entire kinematic mechanism has only one degree of freedom, i.e. can be operated by one hand, but also that there is tolerance compensation with respect to the rail bolt in the rail 13.

Provided on the front foot 11, above the receptacle for the front rail bolt 17 and offset slightly to the rear, is a securing bolt 45 which protrudes laterally outward in the transverse direction of the seat from the front foot 11. The package position is reached when the rear foot 21 is sitting on the securing bolt 45 and the rear catch 25 automatically hooks into place on the securing bolt 45. The package position is automatically secured as a result, which increases the protection against the load. If the need arises, the vehicle seat 1 can also be removed from the motor vehicle. For this purpose, the two front catches 19 are unlocked by means of an unlocking clip 47 running between the two front feet 11, with the result that the double-bolt locking arrangement of the two front feet 11 is released. The automatic securing of the package position is independent thereof.

In order to pivot back the seat into the seat position, its automatic package securing means is unlocked by the operating element 43, i.e. the rear catch 25 is released from the securing bolt 45. By means of pressure on the seat cushion 3 or by pulling the backrest 5 to the rear, the seat cushion 3 is folded downward and the backrest 5 is shifted rearward at the same time. The couplers 29 and 31 and their connecting link guide mean that this movement can also be carried out with one hand. When the seat position is reached, the rear catch 25 re-engages on the rear rail bolt 23 for securing purposes.

In the design described, the bolts for fixing the vehicle seat 1 on the vehicle floor are provided in a rail 13 which is fixed on the vehicle structure. In order to have a plurality of different longitudinal seat positions available, a plurality of suitably spaced apart bolts may be present in the longitudinal direction of the rail 13. In one variant, the bolts are provided for fixing to an upper rail of a pair of seat rails, which upper rail is guided in a sliding manner in a lower rail which is fixed on the vehicle structure. A very wide variety of longitudinal seat positions can therefore be set.

The following is a description of four modifications of the first exemplary embodiment, which differ from the first exemplary embodiment with regard to the design of the slot and tenon guide illustrated in the drawing, but otherwise coincide therewith, in particular with regard to the manner of operation. Identical components are therefore provided with the same reference numbers and modified components are provided with reference numbers together with primes.

Figure 5A:
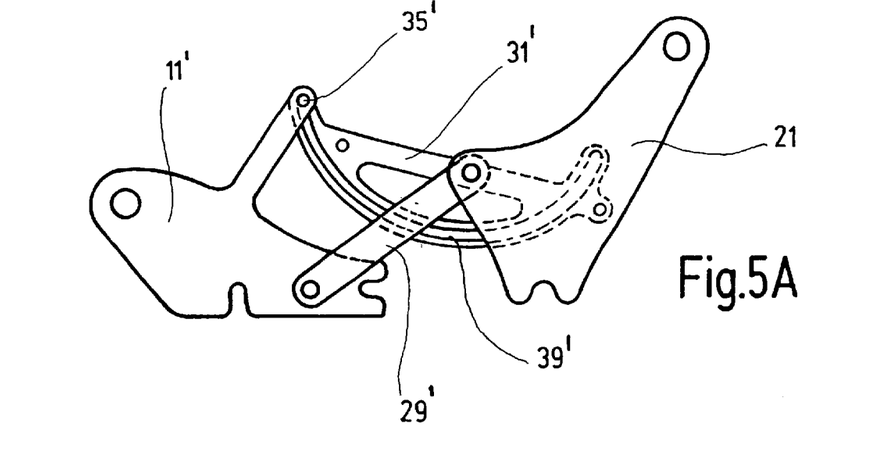
FIG. 5A shows a partial view of a first modification of the first exemplary embodiment.
Figure 5B:
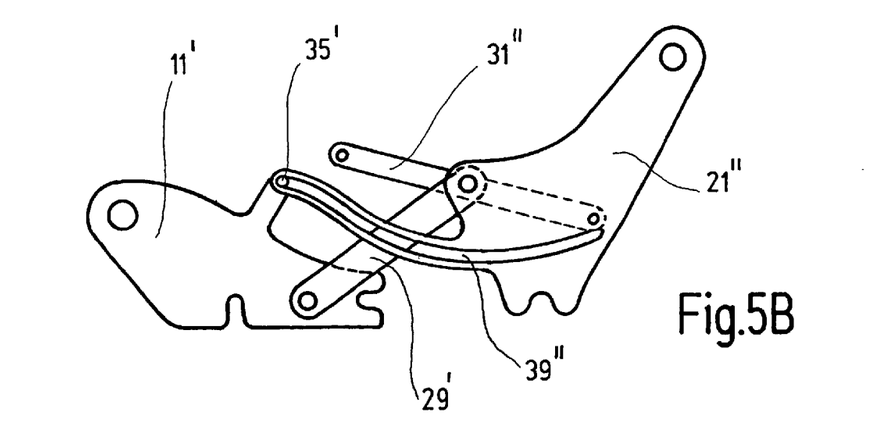
FIG. 5B shows a partial view of a second modification of the first exemplary embodiment.

In a first modification according to FIG. 5A, the first coupler 29', which acts between the front foot 11' and the rear foot 21, is designed in a stretched-out form, while the second coupler 31', which is provided between the seat cushion support 9 and the rear foot 21, bears a curved connecting link 39'. A link block 35' of the front foot 11' engages in this curved connecting link 39'. In a second modification according to FIG. 5B, both the first and the second couplers 29' and 31" are designed in a stretched-out form. A link block 35' which guides a connecting link 39" of the rear foot 21" is provided on the front foot 11'. If single-handed operation is not required, the second coupler 31" can be omitted.

Figure 5C:
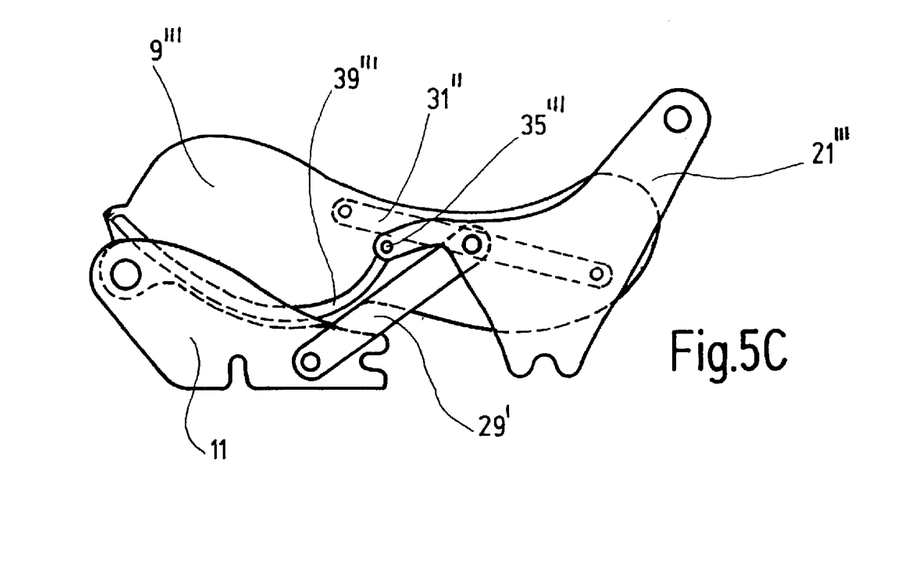
FIG. 5C shows a partial view of a third modification of the first exemplary embodiment.
Figure 5D:
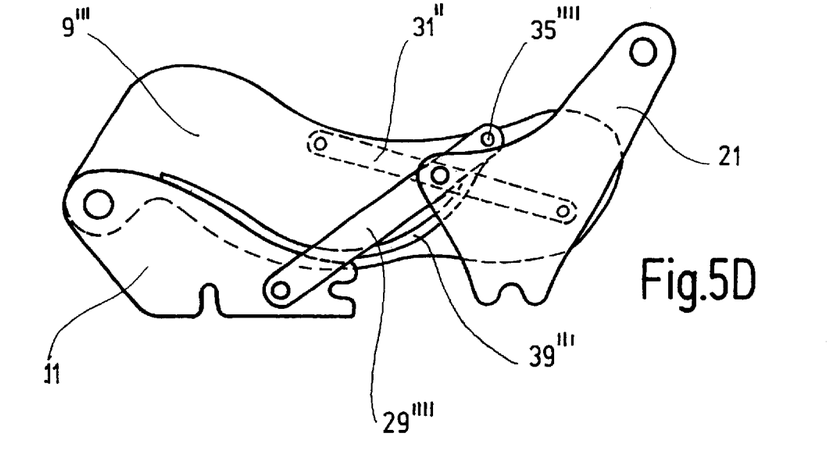
FIG. 5D shows a partial view of a fourth modification of the first exemplary embodiment.

In a third modification according to FIG. 5C, the front foot 11 coincides with the first exemplary embodiment and the two couplers 29' and 31''' coincide with the second modification. A link block 35''' which engages in a connecting link 39''' of the seat cushion support 9''' is fitted on the rear foot 21'''. In a fourth modification according to FIG. 5D, the feet 11 and 21 coincide with the first exemplary embodiment and the seat cushion support 9''' together with the connecting link 39''' and second coupler 31'' coincide with the third modification. The link block 35'''', which is guided by the connecting link 39'', is fitted on the upper end of the first coupler 29''''.

Figure 6A:
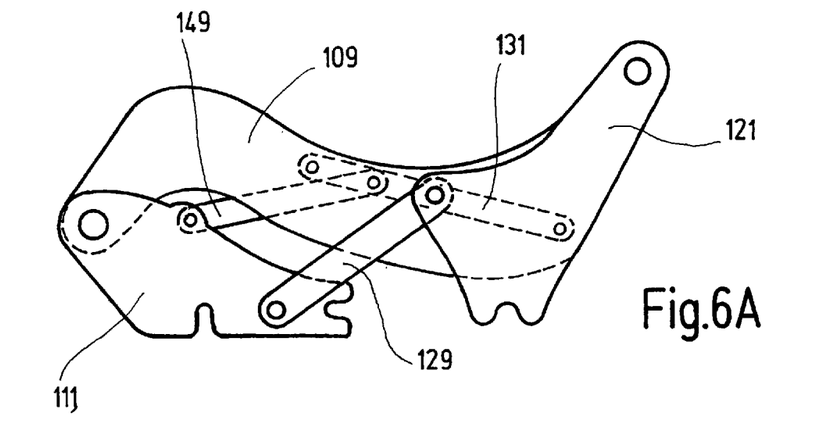
FIG. 6A shows a partial view of the second exemplary embodiment.

The second exemplary embodiment again substantially coincides with the first exemplary embodiment, in particular with regard to the manner of operation and the fixing to the vehicle structure, insofar as it is not described differently below. Components which are identical and which act identically therefore bear reference numbers which are higher by 100. The seat cushion support 109 is coupled at the front to the front foot 111. The rear foot 121 which supports the backrest is coupled to the front foot 111 by means of the first coupler 129. The second coupler 131 between the seat cushion support 109 and the rear foot 121 pulls the rear foot 121 forward during the transfer into the package position. In contrast to the first exemplary embodiment and its modifications, the movement of the rear foot 121 is not defined by a slot and tenon guide but by a third coupler 149 which is coupled to the front foot 111 and to the second coupler 131. The production of the individual components is simplified as a result.

Figure 6B:
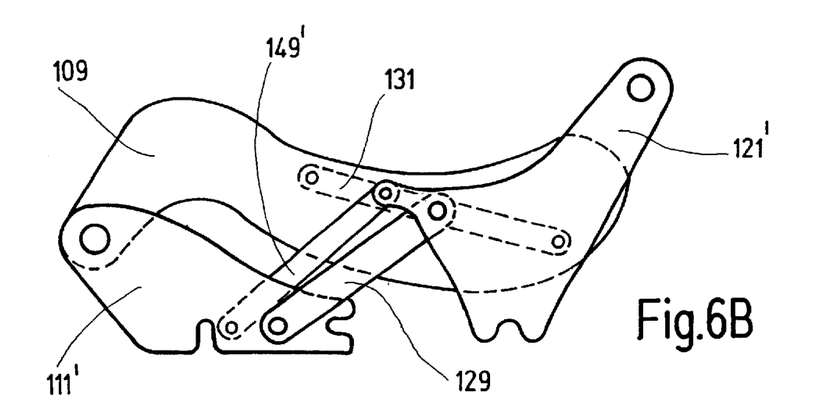
FIG. 6B shows a partial view of a first modification of the second exemplary embodiment.
Figure 6C:
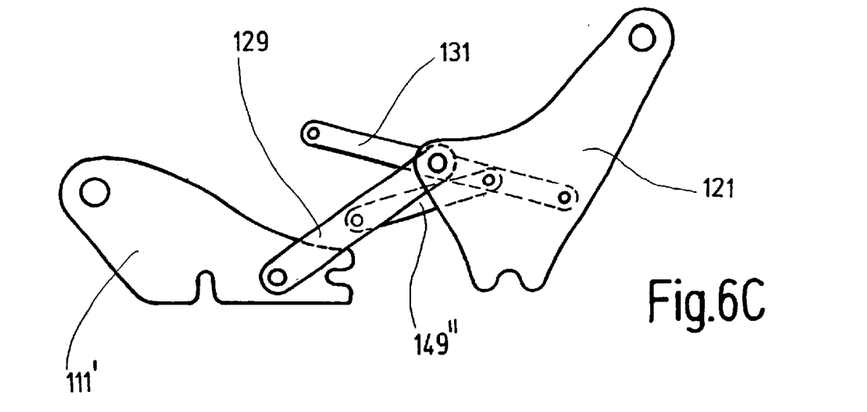
FIG. 6C shows a partial view of a second modification of the second exemplary embodiment.
Figure 6D:
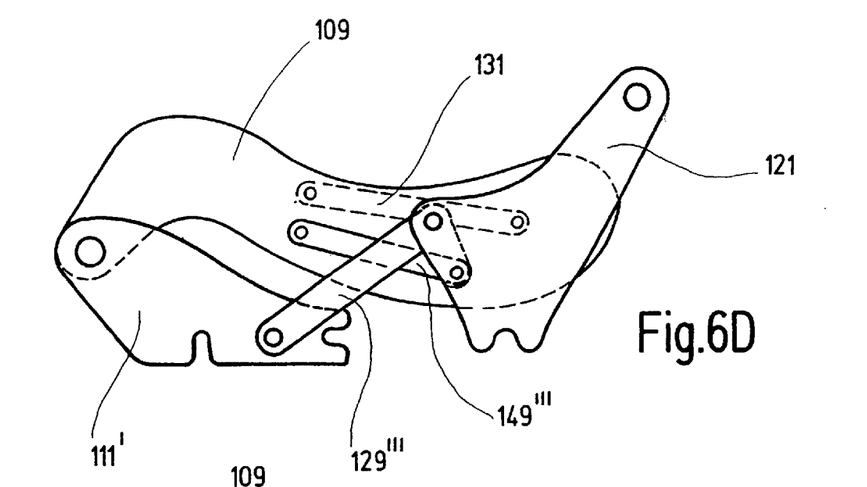
FIG. 6D shows a partial view of a third modification of the second exemplary embodiment.
Figure 6E:
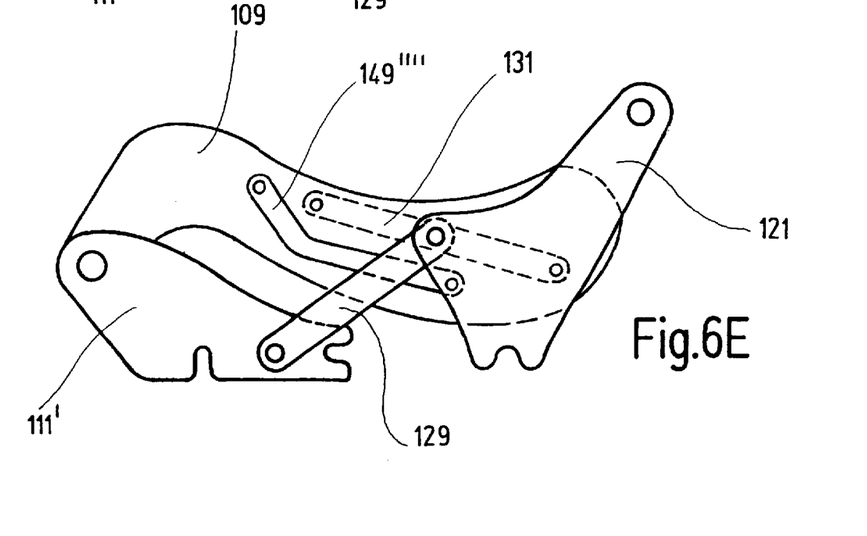
FIG. 6E shows a partial view of a fourth modification of the second exemplary embodiment.

In the modifications described below for this second exemplary embodiment, the modified components bear reference numbers together with primes. In a first modification according to FIG. 6B, the third coupler 149' is provided between the front foot 111' and the rear foot 121', with the result that the third coupler 149' forms a four-bar linkage together with the first coupler 129 and the two feet 111' and 121'. If single-handed operation is not required, the second coupler 131 can be omitted in this first modification. In a second modification according to FIG. 6C, the third coupler 149'' acts between the first coupler 129 and the second coupler 131. In a third modification according to FIG. 6D, an arm is integrally formed on the first coupler 129''' and the third coupler 149''' is coupled to said arm with one end. With its other end, the third coupler 149''' is coupled to the seat cushion support 109. In a fourth modification according to FIG. 6E, the third coupler 149''' is coupled to the seat cushion support 109 and to the rear foot 121.

Figure 7A:
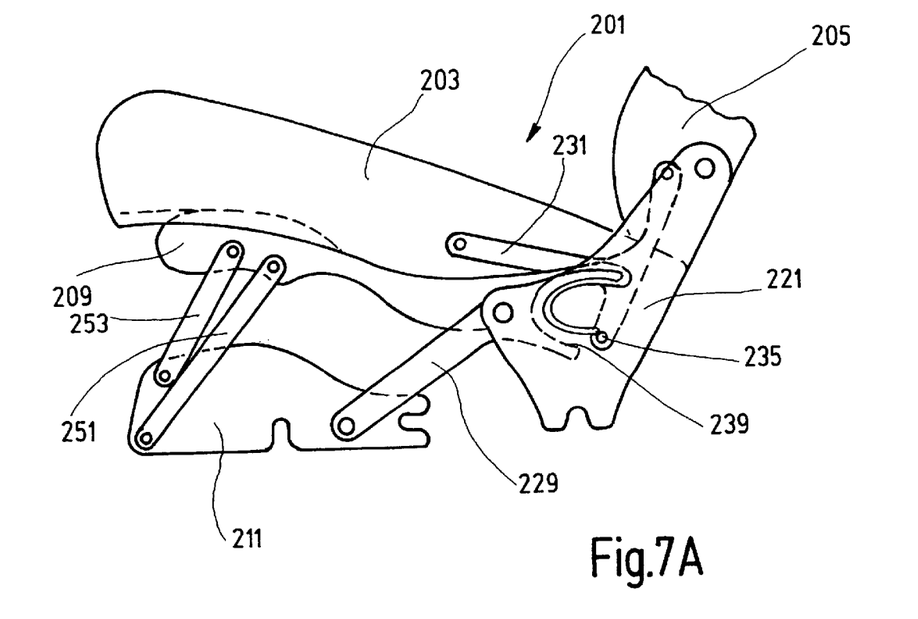
FIG. 7A shows a partial view of the third exemplary embodiment, in the seat position.

The third exemplary embodiment again coincides substantially with the first exemplary embodiment, in particular with regard to the manner of operation during the transfer into the package position and the fixing to the vehicle structure, insofar as it is not described differently below. Components which are identical and act in an identical manner therefore bear reference numbers which are higher by 200. The vehicle seat 201 with its seat cushion 203 on the seat cushion support 209 and its backrest 205 is likewise provided with a front foot 211 and a rear foot 221 on each side. A first coupler 229, which is coupled to the two feet 211 and 221, has a connecting link 239 at the upper end, in which link a link block 235 of a T-shaped second coupler 231 is guided. The second coupler 231 acts between the seat cushion 203 and the backrest 205.

Figure 8A:
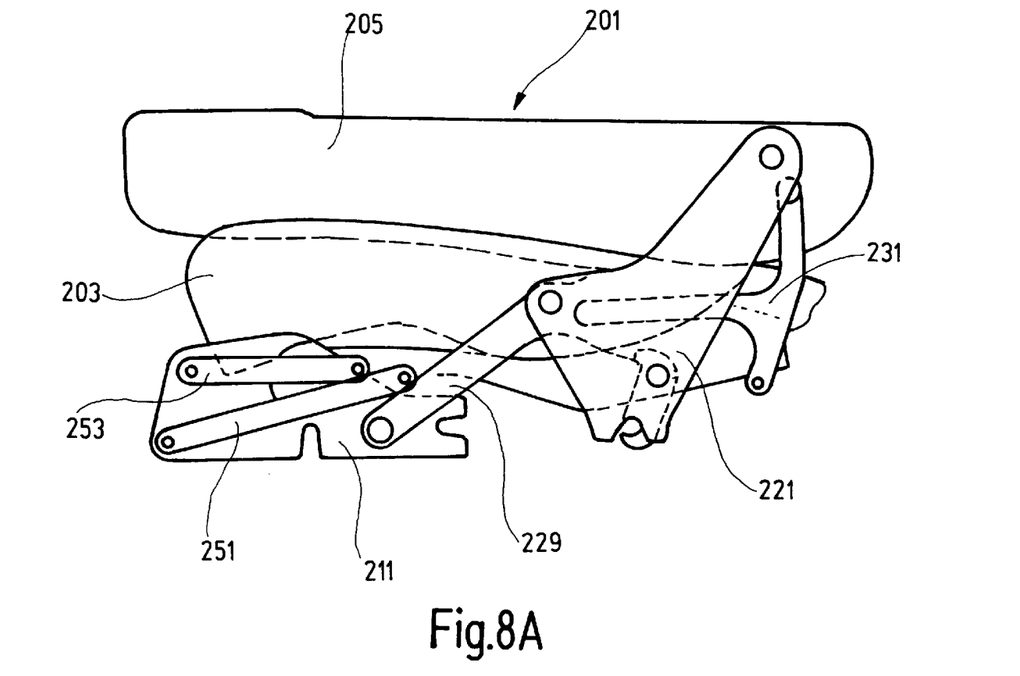
FIG. 8A shows the third exemplary embodiment in the flat floor position.

In addition to the previously described designs, there is firstly coupled between the front end of the seat cushion support 209 and the front foot 211 a supporting load-bearing coupler 251 and, secondly, a control coupler 253 which is offset upward with respect to the load-bearing coupler, i.e. the seat cushion support 209 is coupled by means of a four-bar linkage. With regard to the package position, the components interact essentially as in the first exemplary embodiment. In addition, the vehicle seat 201 can be lowered into a floor position (flat floor position illustrated in FIG. 8A). If the backrest 205 is pivoted forward into a flat position, it presses the seat cushion 203 downward via the second coupler 231. The seat cushion support 209 can be lowered by the four-bar coupling to the front foot 211.

Figure 7B:
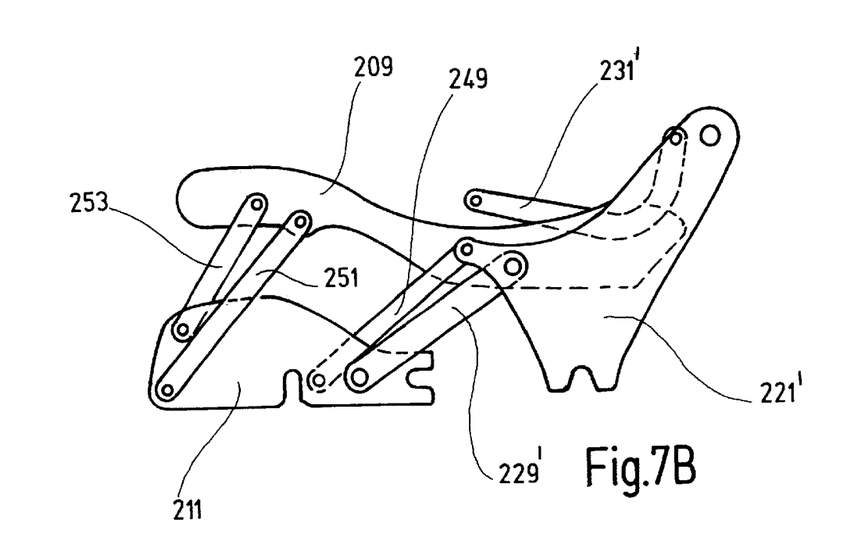
FIG. 7B shows a partial view of a modification of the third exemplary embodiment.
Figure 8B:
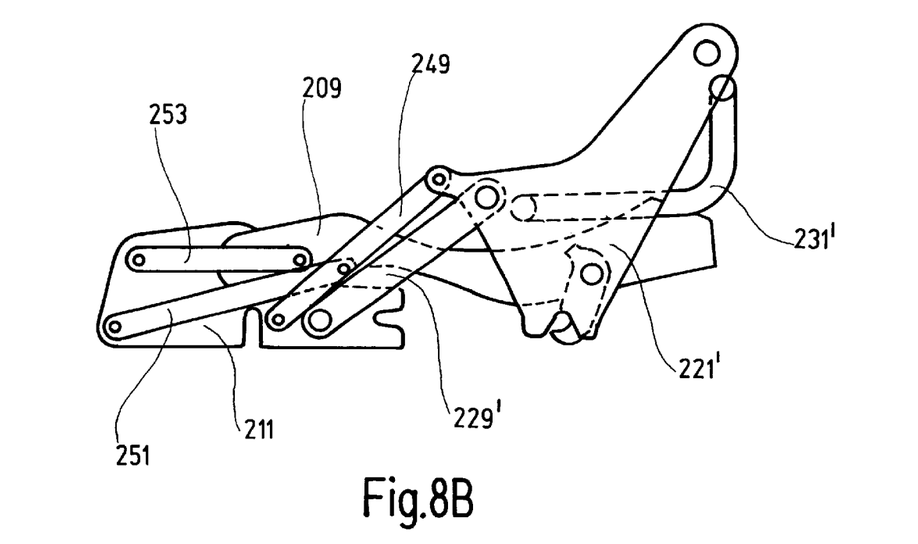
FIG. 8B shows a partial view of the modification of the third exemplary embodiment in the flat floor position.

In a modification thereto, the movement of the rear foot 211' is not defined by a slot and tenon guide. As in the second exemplary embodiment and its modifications, a third coupler 249 is provided in the region of the rear foot 221', which coupler is coupled between the front foot 211 and the rear foot 221', as in the first modification of the second exemplary embodiment. It likewise forms a four-bar linkage together with the first coupler 229. The L-shaped, second coupler 231' between the seat cushion and the backrest is of simpler design in comparison with the third exemplary embodiment.

That which is claimed:

1. A vehicle seat for being fastened to a vehicle structure, comprising:
an articulated seat frame carrying a seat cushion and a backrest, wherein the seat frame is operative so that the vehicle seat can be transferred between at least one seat position and a folded position, with the seat cushion extending at least generally horizontally and the backrest extending at least generally upright from proximate a rear of the seat cushion during the seat position so that a user can sit on the vehicle seat, wherein the seat frame includes rear feet for being releasably fastened to the vehicle structure, wherein the rear feet are positioned closer to the rear of the seat cushion than to a front of the seat cushion while the vehicle seat is in the seat position, wherein the seat frame is operative so that in order for the backrest to be transferred from the seat position into the folded position, after the rear feet are unfastened from the vehicle structure, the backrest executes a forward shifting movement,
wherein the seat frame further includes front feet, which are positioned forward of the rear feet while the vehicle seat is in a seat position, and the seat cushion is pivotably connected to the front feet at a position that is proximate a front end of the seat cushion so that the seat cushion pivots about an axis that is proximate the front end of the seat cushion while the vehicle seat is transferred between the seat position and the folded position, and
wherein while the vehicle seat is in the folded position, simultaneously:
both the seat cushion and the backrest extend at least generally upright, and
the backrest is positioned rearward of the seat cushion.

2. The vehicle seat as claimed in claim 1, wherein the seat frame is operative so that during the transfer from the seat position into the folded position, the pivoting movement of the seat cushion results in the seat cushion folding upward during the shifting movement of the backrest.

3. The vehicle seat as claimed in claim 2, wherein surfaces of the seat cushion and the backrest, which face the user in the seat position, face in at least approximately in the same direction while the vehicle seat is in the folded position.

4. The vehicle seat as claimed in claim 3, wherein the seat frame includes coupling means for causing the shifting movement of the backrest and the pivoting movement of the seat cushion to occur at the same time.

5. The vehicle seat as claimed in claim 4, wherein the coupling means have a slot and tenon guide.

6. The vehicle seat as claimed in claim 5, wherein the coupling means has a plurality of couplers.

7. The vehicle seat as claimed in claim 4, wherein the coupling means have a plurality of couplers.

8. The vehicle seat as claimed in claim 4, further comprising a pneumatic spring which at least assists the pivoting movement of the seat cushion.

9. The vehicle seat as claimed in claim 3, further comprising a pneumatic spring which at least assists the pivoting movement of the seat cushion.

10. The vehicle seat as claimed in claim 3, further comprising a locking element mounted to a first foot of the rear feet for releasably locking the first foot of the rear feet to a first foot of the front feet during the folded position, and thereby releasably locking the vehicle seat in the folded position.

11. The vehicle seat as claimed in claim 10, wherein the locking element is further for releasably locking the first foot of the rear feet to the vehicle structure during the seat position, and thereby releasably locking the vehicle seat in the seat position.

12. The vehicle seat as claimed in claim 3, wherein the rear feet have fastening means for:
releasably fastening the rear feet to the vehicle structure during the seat position, and
releasably holding the vehicle seat in the folded position.

13. The vehicle seat as claimed in claim 3, wherein a single operating element is provided for triggering the transfer into the folded position and for triggering the return into the seat position.

14. The vehicle seat as claimed in claim 3, further comprising rails for being connected to the vehicle structure and for respectively receiving the front and rear feet, with each of the rails including a plurality of locations to which the feet can be respectively releasably locked so that the vehicle seat can be connected to the vehicle structure in various longitudinal seat positions.

15. The vehicle seat as claimed in claim 14, wherein the vehicle seat is constructed so that the vehicle seat can be completely removed from the vehicle structure.

16. The vehicle seat as claimed in claim 3, wherein the seat frame is further operative so that the vehicle seat can be moved into a floor position by pivoting the backrest forward, into an at least generally horizontal configuration, wherein the seat frame is operative so that during the pivoting of the backrest into the at least generally horizontal position the seat cushion is lowered.

17. The vehicle seat as claimed in claim 16, wherein the backrest is in opposing face-to-face relation with the seat cushion while the vehicle seat is in the floor position.

18. The vehicle seat as claimed in claim 3, wherein during the transfer from the seat position to the folded position, inclination of the backrest remains substantially unchanged.

19. The vehicle seat as claimed in claim 3, further comprising a locking catch mounted to a first foot of the rear feet for both:
releasably locking to a bolt to thereby releasably lock the first foot of the rear feet to the vehicle structure during the seat position, and thereby releasably locking the vehicle seat in the seat position, and
releasably locking the first foot of the rear feet to a bolt of a first foot of the front feet during the folded position, and thereby releasably locking the vehicle seat in the folded position.

20. The vehicle seat as claimed in claim 1, wherein:
the seat frame is operative so that:
the pivoting movement of the seat cushion results in the seat cushion folding upward while the vehicle seat is transferred from the seat position to the folded position,
the backrest shifts toward the seat cushion during the shifting movement of the backrest, and
the shifting movement of the backrest and the pivoting movement of the seat cushion occur at the same time while the vehicle seat is transferred from the seat position to the folded position;
the front feet remain fixed with respect to the vehicle structure while the vehicle seat is transferred from the seat position to the folded position;
the rear feet are proximate the front feet while the vehicle seat is in the folded position;
surfaces of the seat cushion and the backrest, which face the user in the seat position, face in at least approximately in the same direction while the vehicle seat is in the folded position; and while the vehicle seat is in the folded position:
- a highest portion of the seat cushion is at an upper elevation,
- a lowest portion of the seat cushion is at a lower elevation, and
- a lowest portion of the backrest, which is where the rear feet are attached to the backrest, is closer to the lower elevation than to the upper elevation.

21. The vehicle seat as claimed in claim 20, wherein the rear feet have fastening means for:
   releasably fastening the rear feet to the vehicle structure during the seat position, and releasably holding the vehicle seat in the folded position.

22. The vehicle seat as claimed in claim 20, further comprising a locking element mounted to a first foot of the rear feet for releasably locking the first foot of the rear feet to a first foot of the front feet during the folded position, and thereby releasably locking the vehicle seat in the folded position.

23. The vehicle seat as claimed in claim 22, wherein the locking element is further for releasably locking the first foot of the rear feet to the vehicle structure during the seat position, and thereby releasably locking the vehicle seat in the seat position.

24. The vehicle seat as claimed in claim 20, wherein during the transfer from the seat position to the folded position, inclination of the backrest remains substantially unchanged.

25. The vehicle seat as claimed in claim 20, wherein the rear feet have fastening means for:
   releasably fastening the rear feet to the vehicle structure, and
   releasably securing the vehicle seat in the folded position.

26. The vehicle seat as claimed in claim 20, wherein the seat cushion is carried by a cushion carrier that is directly pivotably connected to the front feet at the position that is proximate the front end of the seat cushion so that the seat cushion pivots with the cushion carrier about the axis that is proximate the front end of the seat cushion while the vehicle seat is transferred between the seat position and the folded position.

27. The vehicle seat as claimed in claim 20, wherein the seat cushion is supported by four-bar linkages.

28. The vehicle seat as claimed in claim 27, wherein the seat frame is further operative so that the vehicle seat can be moved into a floor position by pivoting the backrest forward, into an at least generally horizontal configuration, wherein the seat frame is operative so that during the pivoting of the backrest into the at least generally horizontal position the seat cushion is lowered.

29. The vehicle seat as claimed in claim 20, wherein the seat frame includes coupling means for causing the shifting movement of the backrest and the pivoting movement of the seat cushion to occur at the same time, and the coupling means includes a first coupler between one of the front feet and one of the rear feet, for supporting the shifting of the backrest.

30. The vehicle seat as claimed in claim 29, wherein the coupling means further includes a second coupler between the seat cushion and the rear foot or the backrest for forcing the seat cushion to fold upward while the backrest shifts forward.

31. The vehicle seat as claimed in claim 29, wherein the coupling means have a slot and tenon guide.

32. The vehicle seat as claimed in claim 20, wherein:
   the rear feet are releasably locked to the front feet in the folded position by way of at least one locking element, which is mounted to a first foot of the rear feet, being releasably locked to a locking element mounted to a first foot of the front feet,
   the locking element mounted to the first foot of the rear feet is either a catch or a bolt, and
   the locking element mounted to the first foot of the front feet is either:
     a catch that is releasably latched onto the bolt during the folded position, or
     a bolt onto which the catch of the first foot of the rear feet is releasably latched during the folded position.

33. The vehicle seat as claimed in claim 20, wherein a single operating element is provided for triggering the transfer into the folded position and for triggering the return into the seat position.

34. The vehicle seat as claimed in claim 20, further comprising rails for being connected to the vehicle structure and for respectively receiving the front and rear feet, with each of the rails including a plurality of locations to which the feet can be respectively releasably locked so that the vehicle seat can be connected to the vehicle structure in various longitudinal seat positions.

35. The vehicle seat as claimed in claim 20, wherein the vehicle seat is constructed so that the vehicle seat can be completely removed from the vehicle structure.

36. The vehicle seat as claimed in claim 20, further comprising a locking catch mounted to a first foot of the rear feet for both:
   releasably locking to a bolt to thereby releasably lock the first foot of the rear feet to the vehicle structure during the seat position, and thereby releasably locking the vehicle seat in the seat position, and
   releasably locking the first foot of the rear feet to a bolt of a first foot of the front feet during the folded position, and thereby releasably locking the vehicle seat in the folded position.

* * * * *

UNITED STATES PATENT AND TRADEMARK OFFICE
CERTIFICATE OF CORRECTION

PATENT NO. : 6,655,738 B2  Page 1 of 1
DATED : December 2, 2003
INVENTOR(S) : Kämmerer It is certified that error appears in the above-identified patent and that said Letters Patent is hereby corrected as shown below:

Title page,
Item [56], References Cited, U.S. PATENT DOCUMENTS, insert the following:
-- 6,520,581 B1    2/2003    Tame --.

Signed and Sealed this

Twenty-fourth Day of February, 2004

JON W. DUDAS
*Acting Director of the United States Patent and Trademark Office*